May 19, 1964   J. A. NEDERBRAGT ETAL   3,134,061
CONTROL OF ELEVATOR MOTORS
Filed June 27, 1960   5 Sheets-Sheet 1
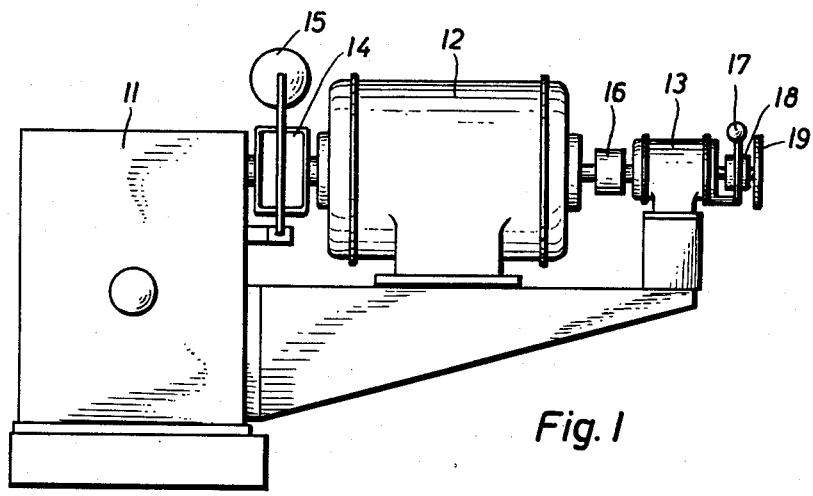
Fig. 1
Fig. 2
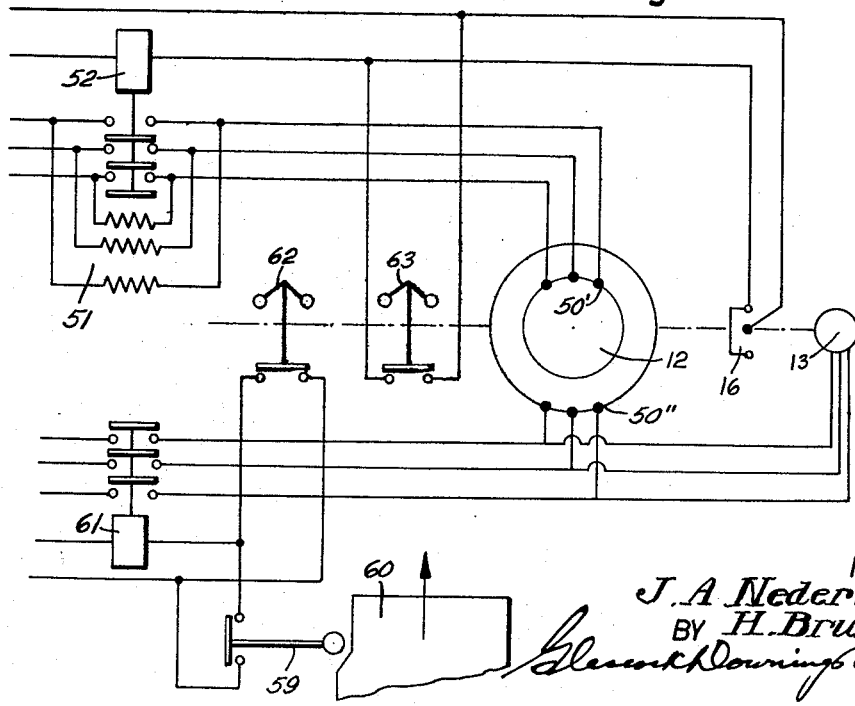
INVENTORS
J. A. Nederbragt
BY H. Bruncken
ATTYS.

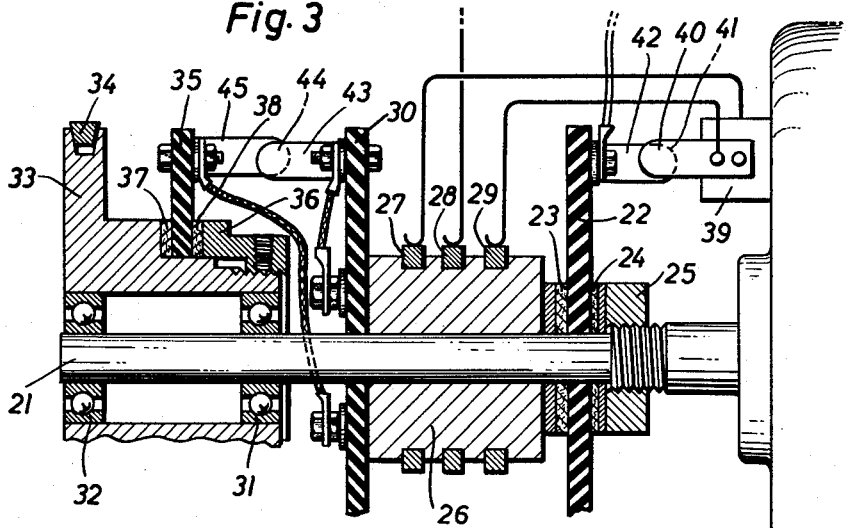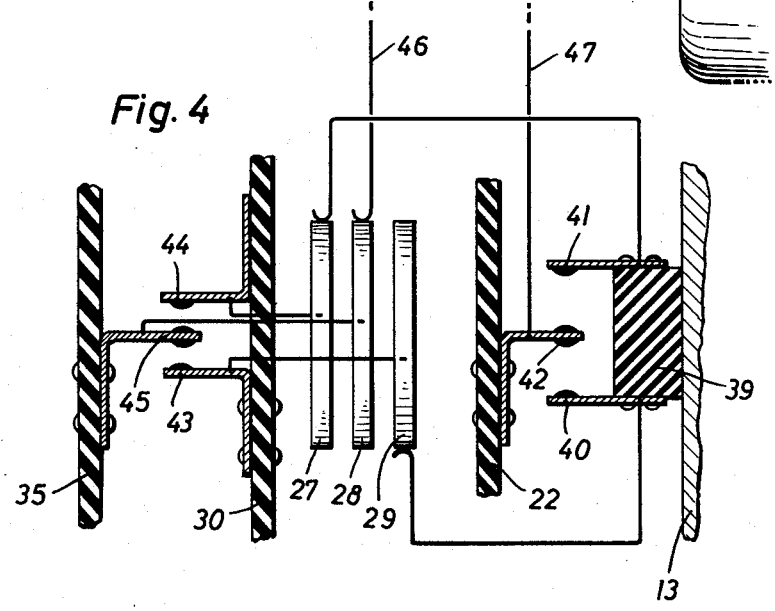

United States Patent Office 3,134,061
Patented May 19, 1964

3,134,061
CONTROL OF ELEVATOR MOTORS
Jacob A. Nederbragt, Mauvestraat 5, Zaandam, Netherlands, and Hans Bruneken, Auenweg 7, Rodenkirchen, near Cologne, Germany
Filed June 27, 1960, Ser. No. 38,956
Claims priority, application Germany June 30, 1959
13 Claims. (Cl. 318—77)

This invention relates to the control of electric motors for elevators.

The problem of bringing the elevator to rest at the various floor levels is a known one. The most important points which arise in this connection are as follows:

The place where the actual signal is given which initiates braking as in general fixed in the elevator shaft or head gear. This necessitates a particular shape of braking curve if the elevator is to be brought to rest exactly at floor level. Errors arise due to various influences which cause the elevator to come to rest not accurately at the desired levels. If the braking gear is mechanical in the first place differing loads in the cage lead to errors in level. But errors also arise from variations in friction, e.g. on the guide rails and through other factors. If the braking is primarily electric for example through a pole-changing motor or a Ward-Leonard installation, the effects of electro-mechanical conditions, e.g. heat, voltage or the like are noticeable.

Purely mechanical braking which effects braking right up to coming to rest can only be used with relatively low cage speeds. With higher speeds so-called inching is used. That is shortly before the stopping position is reached, for example a pole-changing motor or a Ward-Leonard installation is switched over to low speed in order to obtain as accurate a stopping position as possible. As however a pole-changing motor is very much dependent on the load in regard to the change from high to low speed the ratio of change is limited. In practice the limit is 1:6. With higher ratios between normal speed and inching (e.g. 1:9) due to the errors above mentioned and in particular the dependence on the load during the change-over, the inching movements become variable in length so that in general their average must be made very great. These great lengths nullify the time saved by the higher speed during the main movement. As the inching speed must not exceed a certain value the ratio 1:6 in a pole-changing motor imposes a definite speed limit.

With higher speeds it becomes necessary to employ the expensive Ward-Leonard installation which is not so dependent on load but which still has other sources of error above mentioned. The simple Ward-Leonard installation can therefore only be used for a small speed range above the limit for pole-changing motors. Beyond this a regulatable Ward-Leonard installation must be used. The regulation here is usually a speed regulation depending on time.

This method has the following disadvantages however:

(1) The proper correction value can only be accurately ascertained with difficulty as it is constituted by the relatively small value of the difference between two relatively high available values for measurement.

(2) Errors arising during the regulation in relation to the distance travelled cannot be compensated.

Installations in which the speed is regulated in accordance with the distance travelled also exist. In this method the disadvantage (2) above mentioned disappears, but the disadvantage specified under (1) still exists. In view of this, very severe requirements are imposed on the regulating apparatus, which render it very expensive.

Methods are also known according to which the braking procedure is regulated in accordance with the course of starting up. These can however only take into account the effects of the load in the cage. All other quantities have an influence such as variations in friction, variations in voltage and variations in heating up of the electrical gear are not taken into account. With these control methods its is even possible for the errors which normally arise to be increased. Further these mehods are not able to effect correction, or partial correction if the cage has not reached full speed between the two levels.

Systems are also known which effect a measurement of the useful load and predetermine the braking power in accordance with the measurement. These systems also only take into account the effect of the load in the cage, but not the other sources of error.

The purpose of the invention is to mitigate or overcome the disadvantages above mentioned. The basis of the invention consists in comparing for example during braking the braking path of the elevator with a model elevator running in parallel, which consequent upon constant loading and constant braking conditions is always subjected to the same braking procedure. This so-called model elevator can, according to the invention, take the form of a small motor which hereafter will be referred to as a model motor. This model motor is switched on and off and braked simultaneously with the elevator motor and is constructed with a desired starting, running or braking characteristic.

Between the shaft of the eleavtor motor and that of the model motor is provided a measuring member which during braking, or also during starting up, ascertains differences in the respective distances moved and transmits these errors in the form of a signal, of some kind to a regulating member, for example an amplifier or the like. The difference in the angle of rotation measured constitutes a direct measure of the error in travel which has arisen. Since the error of travel is ascertained as a direct quantity the regulating apparatus connected to the measuring member can be relatively simple.

The direct measurement according to the invention of an error in travel which supplies an ideal measurement makes it possible to regulate the changing over operation of a pole-changing motor in a particularly simple manner. The regulating apparatus here required can, as described below, be made very simple. Through the maintainance of the distance travelled to a constant value during the change-over operation it becomes possible to use pole-changing motors with a higher speed ratio than 1:6. In this way the general desire for higher speeds or greater accuracy of stopping can be satisfied without its being necessary to use an expensive and complicated Ward-Leonard installation.

The braking of the model motor used in the invention can be effected by an electrical or an electro-mechanical brake, e.g. an eddy current brake or a friction brake, and a desired braking curve can be obtained by the aid of a program controller.

If the main elevator motor is a pole-changing motor regulation of it can be effected for example by short circuiting of resistances or chokes, or by partial short circuiting in one or more stages, or by continuous regulation through rheostats, tubes, or variable inductances.

In its simplest form the measuring member between the two motors can be a simple contact which simply closes and opens. For continuous regulation the measuring member is advantageously constructed as a potentiometer.

Obviously starting up can also be controlled by the model motor through the measuring member and regulating member according to some predetermined starting curve.

A simplified embodiment of the invention consists in that to initiate the braking operation, the high speed connection of a pole-changing motor used as the elevator motor, and therefore also the model motor, is simply switched off, so that the elevator continues to run under the action of inertia and that upon a predetermined difference in angle of rotation between the elevator motor and the model motor the lowest speed of the elevator motor is switched on.

To carry out this procedure in accordance with the invention a circuit breaker is included in the leads to the high pole number windings of the pole-changing three phase motor, which when open breaks the circuit of the high pole number windings and in the control circuit of which a measuring member constructed as a contact closer lies which according to the difference angle between the elevator motor and the model motor closes the control circuit for the circuit breaker.

A further embodiment of the invention is an improvement of the control above described for the case in which the acceleration path is very short as in the case of high cage speeds. For this case an improvement in the correction for low starting speeds at the commencement of braking, as arise for example with very short distances between stopping levels, is possible. This is particularly the case when the starting speed is so low that after switching off the low pole number winding of the pole-changing elevator motor the difference angle between the elevator motor and the model motor at which the lowest speed of the elevator motor is switched on is not reached.

This improvement consists in that when the shaft switch is passed the low pole number winding of the elevator motor remains switched on until a predetermined speed is reached and is then automatically switched off, it may be with simultaneous switching on of the high pole number winding. Additionally however, the high pole number winding of the elevator motor can be automatically switched on when the running down falls below the inching speed.

A control system for carrying out this method is characterised by the circuit breaker being provided with a shunt which is opened and closed by means of a switch depending on the speed of the elevator motor, preferably a centrifugal switch.

A further switch depending on the speed of the elevator motor, preferably a centrifugal switch, can be provided which switches in the high pole number windings of the elevator motor upon reaching a predetermined speed of the elevator, e.g. a speed below the inching speed.

The invention will be described in further detail with reference to the accompanying drawings which illustrate regulating systems according to the invention and show graphs illustrating the operation.

FIGURE 1 shows in outline an elevator drive provided with control apparatus according to the invention.

FIGURE 2 shows a basic circuit diagram of the control system of this invention.

FIGURE 3 is a side view of a contact operating device serving as a measuring member of the speed difference between the main driving motor and model motor.

FIGURE 4 is a plan view of part of FIGURE 3.

Figure 5:
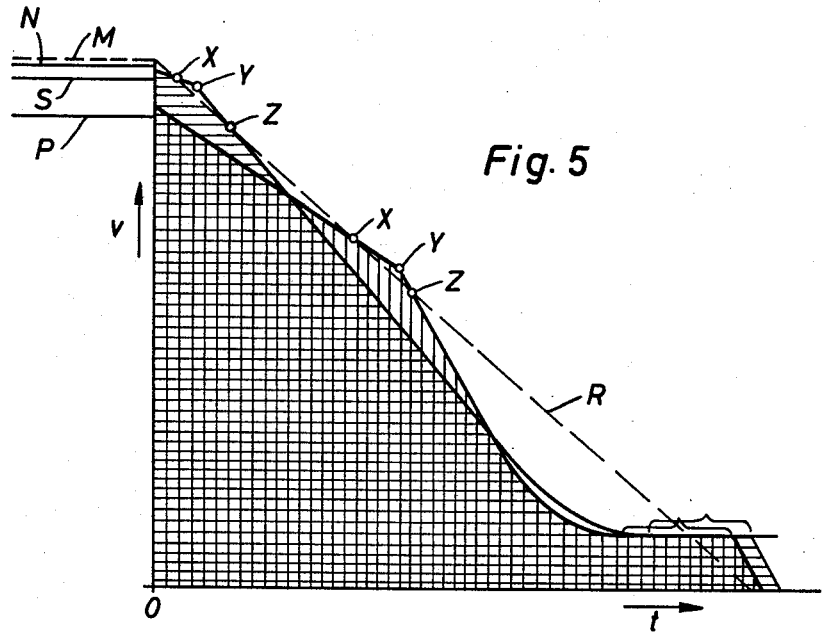
FIGURE 5 is a time speed graph showing the course of braking of a pole-changing elevator motor controlled by the contact operating device of FIGURES 3 and 4.

FIGURE 1 illustrates in principle an arrangement embodying the invention. The elevator winch is marked 11, the elevator motor 12 and the model motor 13. The elevator is braked by a brake 14 disposed between the winch 11 and the motor 12, which brake is actuated by means of an electro-magnet 15. Between the elevator motor 12 and model motor 13, a measuring member 16 is connected which measures the difference in angular rotation between the two motors and thus for example ascertains departures during braking from a prescribed course of braking. As already mentioned the difference in angle measured constitutes a direct measure of the error in distance moved. The model motor 13 is provided with a brake 18 actuated by means of an electromagnet 17 and arranged between the model motor 13 and a flywheel 19. Naturally the model motor 13 could be in some other position for example beside the main motor in which case the coupling could be for example through a V-belt drive to the measuring member.

FIGURE 2 shows a basic circuit diagram of the control system according to the invention. The elevator motor 12 is a pole-changing polyphase motor which permits the selection of two different rotational speeds and thus of two different elevator speeds. For the low rotational speed, the elevator motor 12 has, e.g., a winding 50' with 36-poles (high poled), and for the high rotational speed a winding 50'' with 4-poles (low poled). The high-poled or low speed winding 50' is connected with the supply lines by way of an impedance 51 (resistance or the like), which achieves a weakening of the generator braking effect. The impedance 51 can be bridged by means of a relay 52 placed in parallel with the impedance 51, which results in the normal, strong braking action.

The first braking stage is made operative by means of a shaft switch 59 which can be actuated directly from the elevator cage 60, or by means of a contact disposed in the elevator shaft and actuated in dependence on the position of the cage 60, in that it switches off the low-poled winding 50'' of the elevator motor 12, as well as the guide motor 13, e.g. by way of a relay 61, and switches on the high-poled winding 50' connected to the supply lines by way of the impedance 51 as well as the brake of the guide motor 13. The second braking stage is initiated by the contact maker 16 disposed between the elevator motor 12 and the guide motor 13, said contact maker, on reversal of the relative speed between elevator motor 12 and guide motor 13, providing a control current for the relay 52 and closing it, so that the stronger second braking stage goes into action.

In a simplified embodiment the impedance 51 is omitted, so that only the switch 52 is disposed in the supply lines to the winding 50' for the small rotational speed of the pole-changing elevator motor 12.

For initiating the braking action, the low-poled winding 50'' and the guide motor 13 are switched off, so that the elevator unit continues to move under the influence of the mass moment of inertia until the speed of the motor 12 overlaps the speed of the guide motor 13 and the contact maker 16 switches on the strong braking stage by way of the switch 52.

Figure 9:
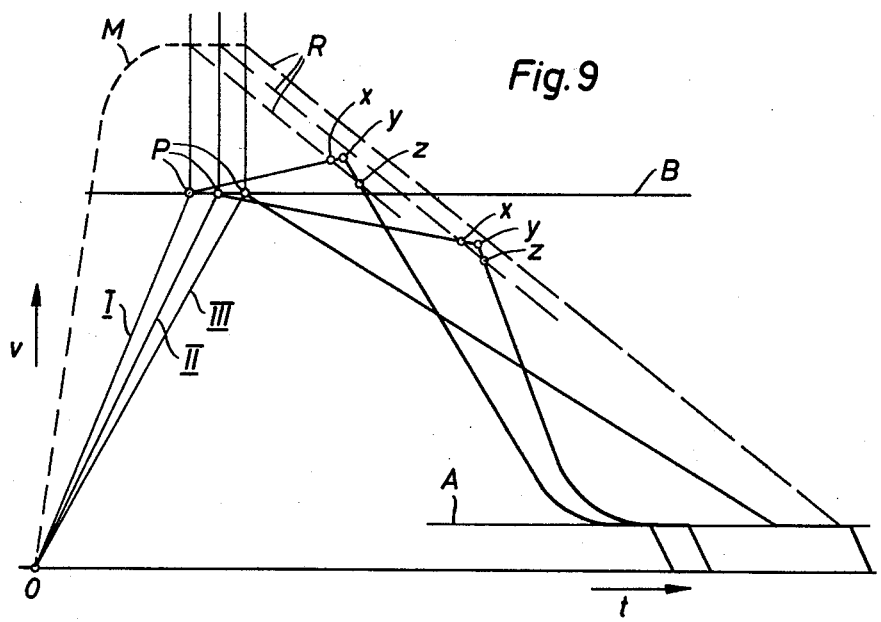
FIGURE 9 is a time speed diagram of the course of braking of a pole-changing elevator motor, the control apparatus of which is also provided with a centrifugal switch.

In parallel with the shaft switch 59 there can be provided a centrifugal switch 62 driven by the elevator motor 12, which bridges the shaft switch 59 until the elevator motor 12 has reached a predetermined speed B (see FIGURE 9). Similarly, a centrifugal switch 63 driven by the elevator motor 12 can be disposed in parallel with the contact maker 16, said switch switching on the high-poled winding 50' of the elevator motor when the slowing-down speed drops below the speed A (see FIGURE 9).

The construction of the contact member is illustrated in FIGURE 3. On a prolongation 21 of the shaft of the model motor 13 is loosely mounted an insulating disc 22 which is gripped lightly between two felt or the like discs 23, 24. The grip of this slipping clutch can be adjusted by a nut 25 which applies pressure to the felt discs. Fixed on the shaft 21 is a body 26 carrying three slip rings 27, 28 and 29. To the body is also fixed an insulating disc 30. On the outer end of the shaft a V-belt pulley 33 is journalled on two ball bearings 31, 32 and is driven by a V-belt 34 from the main motor. The diameter of the pulley 33 is such that under the conditions when the lead is driving the elevator and before initiation of braking, the shaft 21 of the model motor 13 runs a little faster than the pulley 33. The pulley 33 carries loosely a third insulating disc 35 coupled to the pulley by a slipping clutch constituted by two discs 37, 38 pressed by the aid of a nut 36. To the housing of the model motor 13 an insulating block 39 is secured, carrying two contacts 40 and 41 between which moves the contact 42 secured on the insulating disc 22. Two contacts 43 and 44 are provided on the insulating disc 30 between which a contact 45 on the insulating disc 35 is located.

The relative positions and connection of the contacts 40 and 45 are visible in FIGURE 4. According to the direction of rotation of the model motor 13 the contact 42 engages the contact 40 or the contact 41. According to the direction of relative rotation between the pulley 33 and the shaft 21 of the model motor 13 the contact 45 engages the contact 43 or the contact 44. The signal for the shorting circuit breaker passes through the leads 46, 47 and the control circuit is closed when the speed of the model motor 13 is less than that of the pulley 33.

The kinetic conditions during the course of braking of a pole-changing elevator motor controlled by the contact member just described are shown in FIGURE 5 in the form of a speed time curve. At the instant O the changeover operations are started from the contact in the elevator shaft. The speeds of the model and the main motor were practically constant. The line P indicates the speed of the pulley driven from the main motor under conditions of maximum positive load and N indicates its speed at maximum negative load. The line S indicates the speed of the pulley at synchronous speed of the main motor at its higher speed. The broken line M indicates the corresponding speed of the model motor. As already mentioned it lies somewhat above the maximum speed at which the pulley is driven from the main motor.

At the instant when the main motor is to be switched over from high to low speed, the brake of the model motor comes into action. The brake of the model motor is for the purposes of illustration assumed to be so set and its braking action so controlled that it produces uniform retardation as indicated by the line R in the graph. As an example of the course of movement of the actual cage or in other words the main driving motor two curves representing different loads have been selected at random. The two curves selected are respectively just above the minimum main motor speed P and just below the maximum main motor speed N.

At the instant O when the model motor brake is applied at the same time the main driving motor is switched to low speed. At this instant the shorting circuit breaker is opened so that the main motor has a weak braking action. The point X is reached when the main motor has slowed down to the same speed as the model motor and as the speed falls still lower the contact 45 carried by the disc 35 leaves the one contact carried by the disc 30 and by the time the point Y is reached it has moved through the short distance which carries it to the other contact whereby the circuit breaker is operated to short the impedance whereupon the strong regenerative braking of the main driving motor commences so that the main motor speed falls more rapidly. A hold-on contact maintains the circuit breaker in this position even though the main motor again reaches the speed of the model motor at the point Z and then falls below it so that there is a change-back between the contact 45 and the contacts 43, 44.

Similar conditions apply with the simplified arrangement above described, in which the circuit breaker is in the leads to the low speed windings of the pole-changing main motor. At the instant O when the brake of the model motor is applied, the high speed windings of the pole-changing motor and the model motor also are switched off. At the same time the circuit breaker for the low speed windings of the main motor is opened so that the elevator continues to run under inertia. It therefore slows down and between the points X and Y the contact 45 changes over causing the circuit breaker to close the circuit of the low speed windings of the motor. As before strong regenerative braking is thereby set up, and as before a hold on contact acts when the point Z is reached.

It has already been mentioned that the surface integral under both curves selected at random from the instant O when the shaft contact closes until the inching speed is reached is the same and this applies to any other load conditions. Thus in every case the cage will have moved the same distance from the initiation of braking by the shaft contact to the point at which it is running at inching speed, in other words the length of the braking path will be the same in every case.

Figure 6:
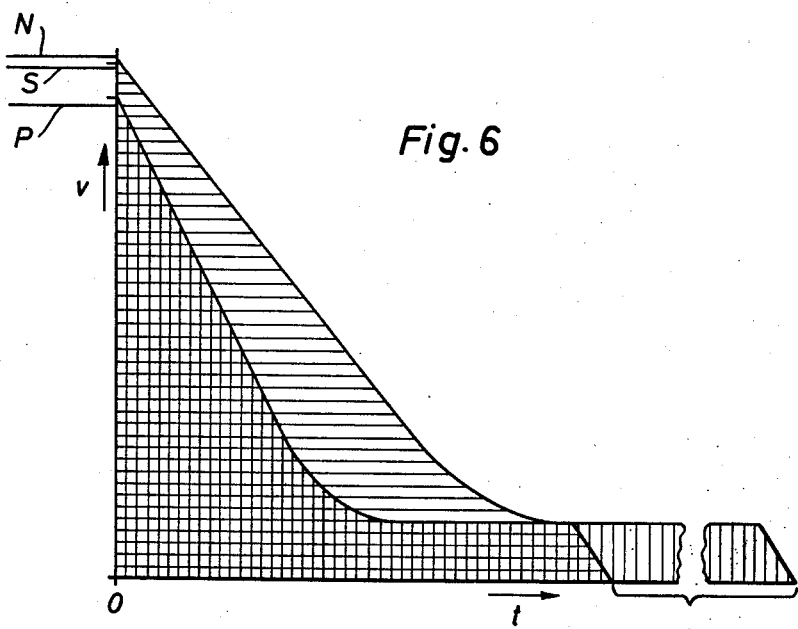
FIGURE 6 is a time speed graph of the course of braking a pole-changing elevator motor as hitherto usual, that is without the provision of a control apparatus according to the invention.

FIGURE 6 shows the corresponding conditions in the case of a pole-changing motor without the control device according to the invention. It will be seen that the difference in the braking distance, that is the distance moved by the cage during braking from full speed to inching speed for different cage loads must be compensated by a relatively large time period during which inching occurs because the distance between the shaft contact and the floor contact is fixed and the total area under the curve from the commencement of braking right up to coming to rest must therefore be the same in both cases. When the control according to the invention is provided practically equal areas under the curve from the full speed down to the inching speed are obtained during braking for different loading conditions so that no great difference in time arise in the operation of bringing the cage to rest from the point of reaching the inching speed. Accordingly pole-changing elevator motors with high speed ratios e.g. 1:9, which for the above discussed reasons illustrated by FIGURE 6 could not be used hitherto, become practicable. But with such motors higher cage speeds can be used than hitherto or more exact stopping positions can be obtained.

Figure 7:
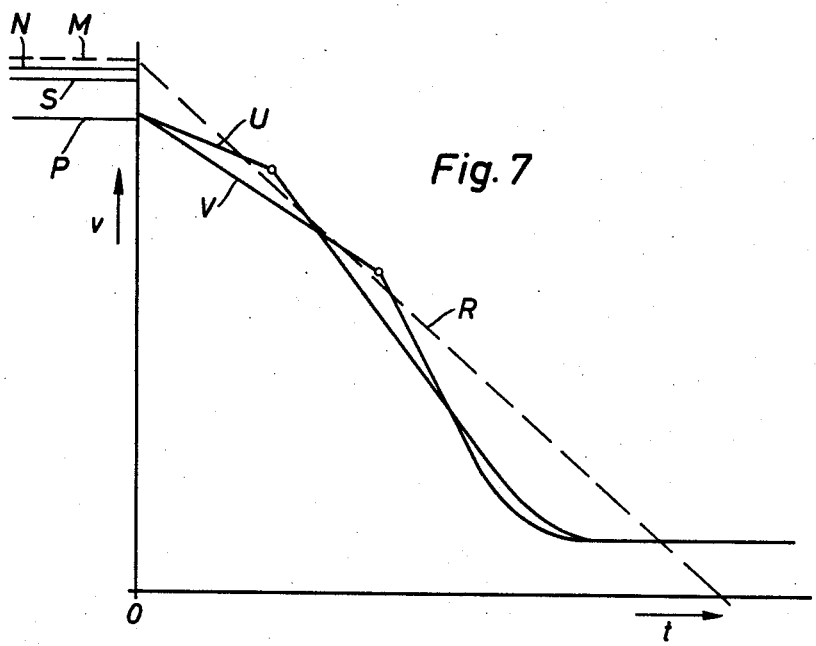
FIGURE 7 is a time speed graph according to FIGURE 5 for different voltages in the supply to the main motor.

With changes in voltage, the above described device also has a correcting action, see FIGURE 7, because for example with low voltage the course of braking of the main motor, indicated by the line U, has less slope and therefore intersects the line R earlier than the line V representing the course of braking under normal voltage. The result is that stronger braking takes place earlier than with higher voltage. This is however the result desired. The line R relating to the model motor remains unchanged because this is mechanically braked.

Figure 8:
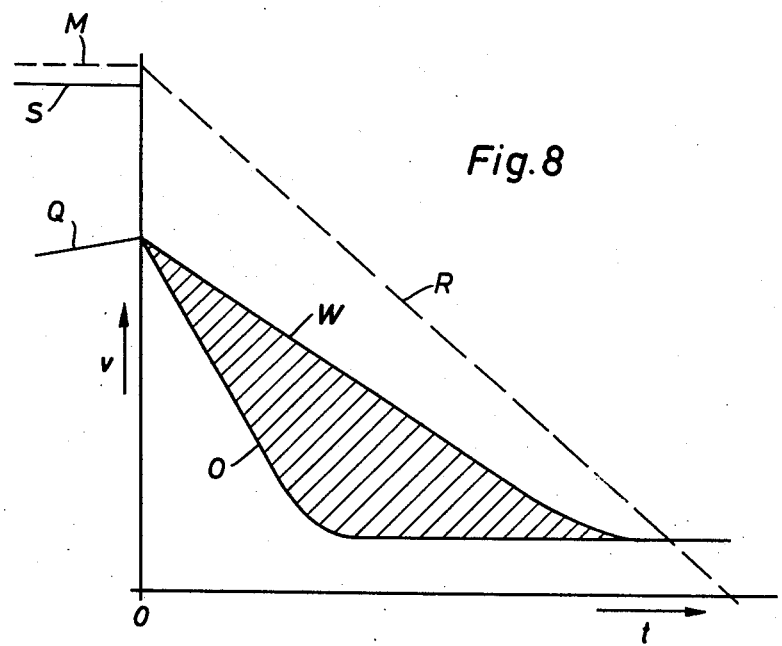
FIGURE 8 is a time speed graph showing the course of braking similar to FIGURE 5 from a lower starting speed of the pole-changing main driving motor.

With lower starting speed, i.e. speed at which braking is initiated, as may arise for example with short distances between successive stops, the above described device also gives a correcting action. FIGURE 8 shows the main motor reaching the instant O at a speed less than the full running speed, indicated by the line Q. Whereas in the usual arrangement without the device according to the invention the course of braking follows the curve O, with the device above described it follows the line W because at this point the impedance is switched in and remains switched in because the line W never crosses the line R. The saving in the distance covered at inching speed will be clear by consideration of the cross hatched area.

The inching operation is always completed with full voltage across the motor terminals because whatever curve the main motor is following it always intersects the line R. Accordingly when the mechanical main brake comes into action the main motor is running asynchronously at the low speed with small slip. By the control of the elevator motor in accordance with the invention greater comfort is obtained. As is well known if braking is suddenly applied this causes considerable discomfort to passengers in the cage.

In FIGURE 6 this is shown by the sharp change in direction of the speed curve at the instant O. When the control according to the invention is used, as FIGURE 5 shows, this sudden change is divided into two less disturbing parts. Heavy retardation is thus achieved in one stage in the old methods but in two stages in the new method.

The elevator constructor can retain the usual control panel or cubicle. An installation incorporating regulation according to the invention involves in addition the model motor, the measuring member, the model motor brake, belt pulley for the main motor and an auxiliary cubicle containing impedance, shorting circuit breaker and a few relays. While the model motor with the contact member is mounted adjacent the main driving motor there remains in addition only the electrical wiring of the auxiliary cubicle but the wiring is relatively simple.

If the retardation path is very short, which may be the case in particular with high normal cage speeds, when the braking is initiated before this speed is reached, then as shown in FIGURE 8, the line Q may be at so low a level that the line W no longer intersects the line R.

For this case, and generally having regard to the inferior correction which is obtained as the line Q is lowered, according to a further development of the invention, it is proposed to provide the main motor with at least one, and preferably two speed-actuated switches A and B for example two centrifugal switches.

FIGURE 9 illustrates the conditions during the braking operation when the elevator motor is controlled by this further embodiment of the control apparatus. The horizontal lines A and B represent two centrifugal switches A and B of which the switch A after switching off the pole number winding switches on the high pole number winding when in the course of running down, that is running under inertia, the speed falls below the inching speed, while the other switch B below the speed for which it is set shunts the elevator shaft contact by which the braking operation is initiated.

In FIGURE 9 three speed time curves (I, II and III for the elevator) and (R for the model motor) are shown for three different cage loads. As with this control the instant at which the place is reached at which the signal which initiates the braking operation is given has no effect on the course of the braking operation, this position is not indicated in FIGURE 9.

From a starting point O the cage is accelerated until it has reached the speed corresponding to the point P. At this speed the switch B switches off the circuit breaker which connects the low pole number winding of the elevator motor to the supply. At the same instant the braking of the model motor commences. The cage then continues to move under the effect of inertia. When during this running down the difference in the angle of rotation between the elevator motor and the model motor has reached a value corresponding to the path of movement corresponding to the contacts carried by the insulating discs 30 and 31 (intersection with the line R) the high pole number winding of the elevator motor is switched on so that strong regenerative braking of the main motor commences. The same can be achieved by means of the switch A if during the running out the inching speed is downwardly passed (intersection with the line A).

With this control also the same surface integrals are obtained so that movement from floor to floor with the desired high speeds is possible without a long inching reserve.

When speed corresponding with the point P is reached before the elevator shaft switch has been reached the control procedure takes place automatically as described with reference to FIGURE 5 or FIGURE 8.

Figure 10:
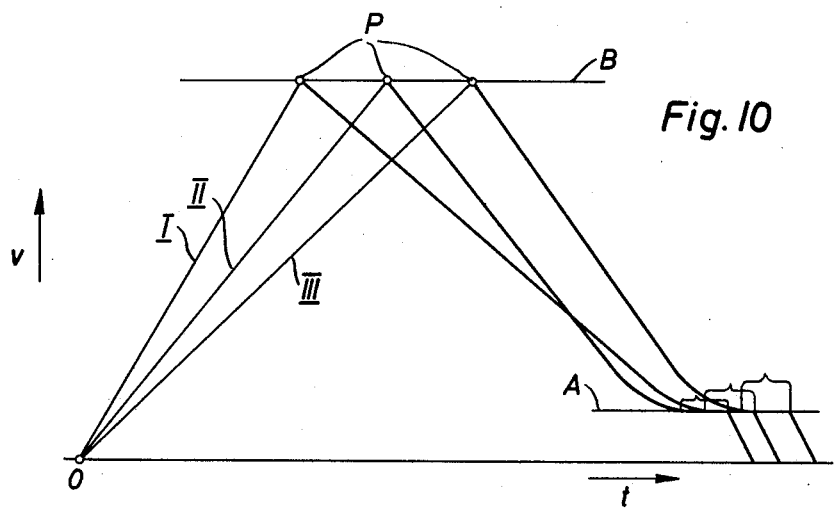
FIGURE 10 is a time speed graph of the course of braking of a pole-changing elevator motor which is controlled by the aid of two centrifugal switches.

FIGURE 10 shows a further possibility for travel from floor to floor in which only the two centrifugal switches A and B control the braking operation. After the cage has been accelerated following the line O—P, the switch B when its operating speed is reached switches the low pole number winding by breaking the shunt of the elevator shaft switch and at the same time switches on the high pole number winding.

In this case also the surface integrals are substantially equal.

The inching itself is always completed with full voltage on the motor terminals.

We claim:

1. A method of controlling an elevator motor comprising the steps of comparing the speed of the elevator motor with that of a guide motor, simultaneously applying a braking force to the guide motor and a first braking force to the elevator motor which is smaller than that applied to the guide motor and thereafter applying a second braking force to the elevator motor which is larger than the first braking force when the speed of the elevator motor under the influence of the first braking force exceeds the speed of the guide motor under the influence of its braking force.

2. A method as defined by claim 1, in which the braking force applied to the guide motor is substantially constant.

3. A control system for an elevator motor provided with a first braking means of relatively weak force and a second braking means of a relatively stronger force, a guide motor provided with a third braking means having a force which is greater than the first braking means and smaller than the second braking means, means for simultaneously applying the first and third braking means to the respective motors, and differential control means responsive to the relative speeds of the motors for applying the second braking means to the elevator motor when its speed under the influence of the first braking means exceeds that of the guide motor under the influence of its braking force.

4. A control system as defined by claim 3, in which the force of the third braking means is substantially constant.

5. A control system as defined by claim 3, in which the first and second braking means are electrically controlled, the differential control means including switch means rendered effective to operate the second braking means when the speed of the elevator motor under the influence of the first braking means exceeds that of the guide motor under the influence of the third braking means.

6. A control system as defined by claim 5, in which the elevator motor is a pole-changing polyphase motor having a high-speed pole winding and a low-speed pole winding, an impedance connected in series with the low-speed pole winding, a relay having normally open contacts connected across said impedance, said switch means being connected to the relay for energizing it to short-circuit the impedance, the low-speed pole winding when in series with the impedance constituting the first braking means and constituting the second braking means when in series with the closed contacts of the relay.

7. A control system as defined by claim 6, including a further switch operated by the elevator cage at a predetermined location thereof for deenergizing the elevator and guide motors and applying the third braking means to the guide motor.

8. A control system as defined by claim 6, in which the switch means includes a trailing contact operating the relay upon reversal of the relative speeds between the elevator and guide motors.

9. A control system as defined by claim 7, including an additional switch shunting the further switch and a centrifugally operated means responsive to a predetermined speed of the elevator motor for opening the additional switch.

10. A control system as defined by claim 3, in which the elevator motor is a polyphase pole-changing motor having a low-speed pole winding and a high-speed pole winding, means for simultaneously deenergizing the high-speed pole winding of the elevator motor and applying the third braking means, whereby the elevator motor continues to move by inertia, and switch means operated by the differential control means to connect the low-speed pole winding for operation as one of the first and second braking means.

11. A control system as defined by claim 5, in which the elevator motor is provided with a low-speed pole winding, a normally open switch in series with the low-speed pole winding, said switch means including a trailing switch for closing the normally open switch to connect the low-speed pole winding as one of the first and second braking means upon reversal of the relative speeds between the elevator motor and guide motor.

12. A control system as defined by claim 11, in which the trailing switch comprises a pair of insulated discs driven respectively by the guide and elevator motors, a pair of spaced contacts carried by one disc and an intermediate contact carried by the other disc, and a slip clutch between one of the motors and its respective disc for frictionally driving the latter.

13. A control system as defined by claim 3, in which the third braking means for the guide motor is a mechanical brake.

References Cited in the file of this patent
UNITED STATES PATENTS

| | | |
|---|---|---|
| 2,465,358 | Curtis et al. | Mar. 29, 1949 |
| 2,719,256 | Mathias | Sept. 27, 1955 |
| 2,874,806 | Oplinger | Feb. 24, 1959 |